United States Patent
Gomez De Sebastian

(12) 
(10) Patent No.: US 6,407,662 B1
(45) Date of Patent: Jun. 18, 2002

(54) SYSTEM TO MONITOR CONDITIONS IN A FLUID-CONTAINING MEMBER

(76) Inventor: Fernando Gomez De Sebastian, E-08190 Sant Cugat del Valles, Barcelona (ES)

( * ) Notice: Subject to any disclaimer, the term of this patent is extended or adjusted under 35 U.S.C. 154(b) by 0 days.

(21) Appl. No.: 09/301,804

(22) Filed: Apr. 29, 1999

(51) Int. Cl.$^7$ .................................................. B60C 23/00
(52) U.S. Cl. ...................... 340/447; 442/443; 442/445; 442/448; 442/626
(58) Field of Search ................................. 340/442, 447, 340/431, 445, 459, 457, 438, 539, 443, 448, 626

(56) References Cited

U.S. PATENT DOCUMENTS

| | | | |
|---|---|---|---|
| 3,533,063 A | 10/1970 | Garcia | 340/58 |
| 4,217,927 A | * 8/1980 | Morita | 137/493.3 |
| 4,609,905 A | 9/1986 | Uzzo | 340/58 |
| 4,694,273 A | 9/1987 | Franchino | 340/58 |
| 4,858,467 A | 8/1989 | Weng | 73/714 |
| 4,978,941 A | 12/1990 | Brown | 340/447 |
| 4,991,618 A | * 2/1991 | Gould | 137/225 |
| 5,040,562 A | 8/1991 | Achterholt | 137/227 |

(List continued on next page.)

FOREIGN PATENT DOCUMENTS

| | | |
|---|---|---|
| EP | 0251355 | 1/1988 |
| EP | 0671289 | 9/1995 |
| EP | 0689950 A2 | 1/1996 |
| GB | 2 279 169 | 12/1994 |
| WO | 90 00119 | 1/1990 |
| WO | 91 04874 | 4/1991 |
| WO | 94 06640 | 3/1994 |
| WO | 95 159191 | 6/1995 |
| WO | 96 06747 | 3/1996 |

OTHER PUBLICATIONS

Derwent Abstract of CH 677759 Jun. 28, 1991.
Derwent Abstract of EP 159133 Oct. 23, 1985.
Derwent Abstract of EP 285806 Oct. 12, 1988.
Derwent Abstract of DE 2441430 Apr. 17, 1975.
Derwent Abstract of DE 2656235 Jun. 15, 1978.

(List continued on next page.)

Primary Examiner—Jeffery Hofsass
Assistant Examiner—Hung Nguyen
(74) Attorney, Agent, or Firm—Maria Parrish Tungol; John A. Parrish

(57) ABSTRACT

The valve assembly according to the present invention includes two valves, an inner valve and an outer valve that cooperate to control the fluid flow in fluid-containing member such as a vehicle tire. The outer valve cooperates with the inner valve to control the flow of fluid in and out of the fluid-containing member. The valve assembly includes an energy source such as a battery between the two valves. During normal operation, the outer valve is closed and prevents the flow of fluid out of the fluid-containing member. If the outer valve is opened, the inner valve is also open to permit the fluid flow in the fluid-containing member. If the energy source is removed, the inner valve component is closed and prevents fluid flow out of the fluid-containing member. The energy source in the valve assembly can be conveniently replaced without the need to deflate or otherwise dismantle the fluid-containing member. This is particularly advantageous when the fluid-containing member is a vehicle tire. By being located inside the valve assembly, the energy source is protected from hazards such as water, dirt, and physical forces. The energy source can be replaced without deflating the tire. The tire can be filled in the normal manner since the inner valve is opened when the outer valve is opened. The valve assembly and energy source are typically part of an electric circuit that can be mounted on a support plate that is attached to the base of the inner valve.

19 Claims, 7 Drawing Sheets

U.S. PATENT DOCUMENTS

| | | | | |
|---|---|---|---|---|
| 5,285,189 A | | 2/1994 | Nowicki et al. | 340/447 |
| 5,339,857 A | * | 8/1994 | Scanllan et al. | 251/38 |
| 5,479,975 A | | 1/1996 | Fogal et al. | 152/429 |
| 5,482,827 A | | 1/1996 | Besio et al. | 430/603 |
| 5,483,827 A | | 1/1996 | Kulka et al. | 73/146.5 |
| 5,540,092 A | | 7/1996 | Handfield et al. | 73/146 |
| 5,573,610 A | | 11/1996 | Koch et al. | 152/539 |
| 5,656,993 A | | 8/1997 | Coulthard | 340/442 |
| 5,754,101 A | | 5/1998 | Tsunetomi et al. | 340/442 |
| 5,774,048 A | * | 6/1998 | Achterholt | 340/447 |
| 5,977,870 A | * | 11/1999 | Rensel et al. | 340/447 |

OTHER PUBLICATIONS

Derwent Abstract of DE 3016337 Nov. 13, 1980.
Derwent Abstract of DE 3709587 Oct. 1, 1987.
Derwent Abstract of DE 3818207 Nov. 30, 1989.
Derwent Abstract of DE 3835236 Apr. 19, 1990.
Derwent Abstract of DE 3930480 Mar. 14, 1991.
Derwent Abstract of DE 4100442 Jul. 16, 1992.
Derwent Abstract of DE 4106848 Sep. 12, 1991.
Derwent Abstract of DE 4129554 Apr. 2, 1992.
Derwent Abstract of DE 4133999 Apr. 22, 1993.
Derwent Abstract of DE 19522486 Jan. 9, 1997.
Derwent Abstract of EP 315885 May 17, 1989.
Derwent Abstract of EP 587306 Mar. 16, 1994.
Derwent Abstract of EP 695652 Feb. 7, 1996.
Derwent Abstract of FR 2225300 Dec. 13, 1974.
Derwent Abstract of FR 2350974 Jan. 13, 1978.
Derwent Abstract of FR 2645799 Oct. 19, 1990.
Derwent Abstract of GB 2171548 Aug. 28, 1986.
Derwent Abstract of GB 2286161 Aug. 9, 1995.
Derwent Abstract of GB 2243010 Oct. 16, 1991.
Derwent Abstract of GB 2307044 May 14, 1997.
Derwent Abstract of JP 08178784 Jul. 12, 1996.
Derwent Abstract of US 4037192 Jul. 19, 1977.
Derwent Abstract of US 4137520 Jan. 30, 1979.
Derwent Abstract of US 4286253 Aug. 25, 1981.
Derwent Abstract of US 4311985 Jan. 19, 1982.
Derwent Abstract of US 4737760 Apr. 12, 1988.
Derwent Abstract of WO 9503947 Feb. 9, 1995.

* cited by examiner

SYSTEM TO MONITOR CONDITIONS IN A FLUID-CONTAINING MEMBER

FIELD OF THE INVENTION

This invention relates to a system for monitoring various conditions of fluid-containing members, particulary inflatable members such as vehicle tires. More particularly, this invention pertains to monitoring systems that include a valve assembly that controls fluid flow into or out of the fluid-containing member and contains an energy source that is accessible without deflating or dismantling the fluid-containing member.

BACKGROUND OF THE INVENTION

It is well known that various conditions of vehicle tires should be monitored to enhance the safety, comfort, and economy of driving the vehicle. Such conditions include the internal temperature and pressure, the wear of the tread, and the expiration date assigned by the manufacturer. Several systems to monitor conditions such as pressure in vehicle tires have been disclosed in the prior art. Two types of such systems have been described in U.S. Pat. No. 4,609,905. The first type is the direct reading of fluid pressure in a tire wherein sealed rotating fittings or electrical slip rings are used in the interface between the wheel and the vehicle body. A second type is the transmission of fluid pressure information through an inductive or magnetic coupling. A third type is the use of radio frequency transmitters and receivers which use radio waves to communicate data between the vehicle tire and the driver in the vehicle.

The radio frequency transmitter is typically affixed to each vehicle tire and operates in conjunction with a receiver located on the vehicle body. The transmitter is preferably inside the tire to avoid being exposed to damage from weather and physical shock. Regardless of its location, the transmitter requires electrical energy for its operation. The energy source is typically a battery. Since the transmitter is located inside the tire, the replacement of any energy source within the transmitter requires the inconvenience of dismounting the tire from the vehicle, deflating the tire and removing the rubber section from the rim section.

This problem has been addressed in several ways in the prior art. Monitoring systems in which the energy source is located outside the vehicle tire as part of the transmitter are disclosed in GB 2279169 and WO 91/04874. However, such systems are susceptible to damage from weather, dirt, and physical shocks. Other systems with energy sources inside the tire are designed to use minimal amounts of electrical energy to extend the useful life of the energy source. However, energy sources such as batteries typically last less than twelve months even with long periods of low or no activity. If the energy source fails prematurely, replacement requires dismounting the tire from the vehicle and deflating the tire.

The problem of providing electrical energy to an electrical device inside the tire by means of a conveniently replaced energy source has not been solved by the systems of the prior art.

SUMMARY OF THE INVENTION

The present invention relates to a valve assembly that controls the fluid flow into or out of a fluid-containing member, particularly inflatable members such as a tire. The valve assembly includes an energy source that is conveniently accessed without dismounting the tire from the vehicle or deflating the tire. At the same time, the energy source is protected against weather, dirt or other hazards. The valve assembly can also include an electrical device such as a transmitter that can be positioned inside the fluid-containing member.

The valve assembly according to the present invention includes two valve sections, an inner valve section and an outer valve section that cooperate to control the flow of a fluid into or out of a fluid-containing member such as a vehicle tire. The inner valve section controls the flow of fluid in and out of the fluid-containing member at or near the entry point of the fluid. The outer valve section is outside the fluid-containing member. The outer valve section cooperates with the inner valve section to control the fluid flow in and out of the fluid-containing member.

The valve assembly of the present invention is typically part of an electric circuit that can be mounted on a support plate that can be part of or attached to the base of the inner valve section. An preferred embodiment of the valve assembly includes a transmitter module as part of the electric circuit. The transmitter module can be mounted on a support plate that is part of or attached to the base of the inner valve.

More particularly, the present invention relates to a valve assembly that includes a main body member having a passageway extending there through, an outer body member having a passageway extending there through and which is connected to a first section of the main body member, an insulating member having a passageway extending there through and which is connected to a second section of main body member. The passageways of the main body member, outer body member and insulating member cooperate to define a continuous passageway for fluid flow wherein the insulating member includes an inner valve that engages the insulating member so as to control fluid flow into or out of the continuous passageway and the outer body member includes an outer valve that engages said outer body member so as to control fluid flow into or out of the continuous passageway.

The valve assembly according to the present invention can also contain an electrical energy source operatively connected to the inner valve and the outer valve. The inner valve and the outer valve cooperate with the energy source to form an electrical circuit. During normal use of the valve assembly according to the present invention there is no change in the procedure for adding or removing fluid currently employed with valves that are well known in the art. Unlike known valves, the valve assembly of the present invention also permits the user to remove and replace the energy source without emptying or dismantling the fluid-containing member.

A system for monitoring conditions inside a fluid-containing member such as a tire includes the valve assembly according to the present invention, an energy source, a transmitter module located inside the fluid-containing member for transmitting signals related to various conditions and a receiver module for receiving transmission of the signals from the transmitter module for communicating information to the user regarding the various conditions inside the fluid-containing member.

The valve assembly according to the present invention permits convenient removal and replacement of the energy source without disturbing the fluid state in the fluid-containing member. There is no the need to empty, open, or dismantle the fluid-containing member in order to replace the energy source. This is particularly convenient when the fluid-containing member is a vehicle tire. By being located between the valve components, energy source is protected from hazards such as water, dirt, and physical forces. The diameter of the energy source is such that fluid flows around the energy source. When the valve assembly is used in a tire, the energy source can be replaced without deflating the tire or even dismounting the tire from the vehicle. The inner valve seals the air inside the tire when the energy source is removed. Once the energy source is replaced, the outer valve again seals the air inside the tire.

These advantages are achieved while adhering to ISO standards for car tire valves and permitting normal procedures typically performed by the user. Even though the valve assembly contains the energy source, the valve assembly complies with ISO standards for valve dimensions in car tires. The tire can be filled or deflated by typical means such as an air pump since the inner valve is opened when the outer valve is opened. The fluid flows around the energy source, through the open inner valve, and into the tire.

DETAILED DESCRIPTION OF THE INVENTION

Figure 1:
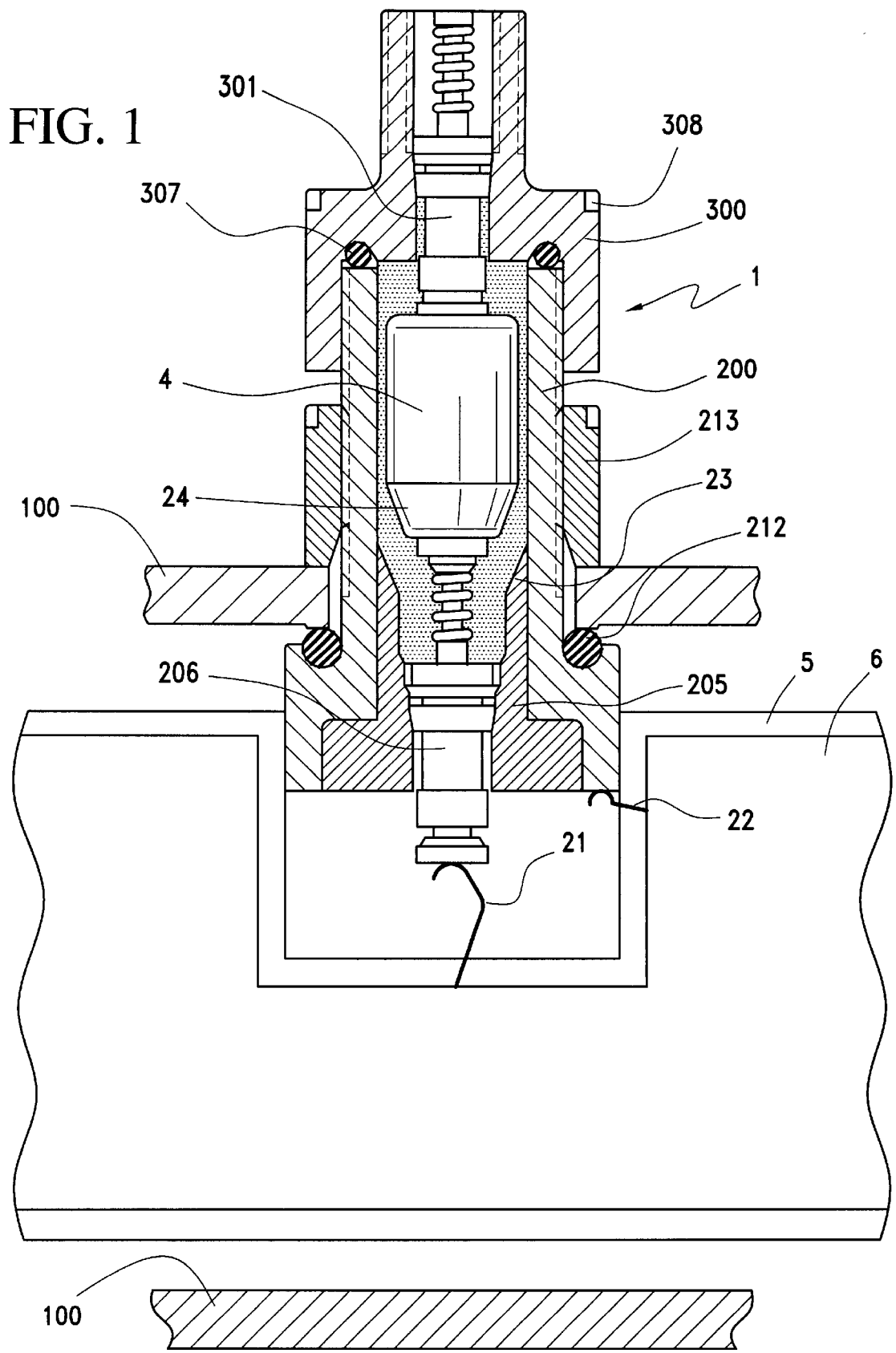
FIG. 1 is a longitudinal cross-section of the valve assembly on a fluid-containing member such as a vehicle tire.

The valve assembly according to the present invention includes two valves, an inner valve and an outer valve that cooperate to control the flow of a fluid in or out of a fluid-containing member, particularly inflatable members such as a vehicle tire. Hereafter, reference will be made to an inflatable member but the fluid-containing member is not limited to inflatable members. The inner valve is partially inside the inflatable member and controls the flow of fluid in and out of the inflatable member. The outer valve is outside the inflatable member. The outer valve cooperates with the inner valve to control the flow of fluid in and out of the inflatable member. During normal operation, the valve assembly has a removable energy source such as a battery between the two valves. The two valves are not in direct contact with each other.

During normal operation of the valve assembly, the outer valve is closed and prevents the flow of fluid out of the inflatable member. When the outer valve is opened, the inner valve is also open to permit the flow of fluid into or out of the inflatable member. The inner valve also controls the flow of fluid in response to the absence of the energy source. When the energy source is removed, the inner valve component closes and prevents flow of fluid out of the inflatable member.

The valve assembly according to the present invention permits convenient removal and replacement of the energy source without disturbing the fluid state in the inflatable member. There is no the need to deflate or otherwise dismantle the inflatable member in order to replace the energy source. This is particularly convenient when the inflatable member is a vehicle tire. By being located between the valve components, energy source is protected from hazards such as water, dirt, and physical forces. The energy source in the valve assembly can be replaced without deflating the tire or even dismounting the tire from the vehicle. The inner valve seals the air inside the tire when the energy source is removed. Once the energy source is replaced, the outer valve again seals the air inside the tire. The tire can be readily filled or deflated in the normal manner since the inner valve is opened when the outer valve is opened.

The valve assembly according to the invention is typically part of an electric circuit that can be mounted on a support plate that can be attached to the base of the inner valve. An advantageous embodiment of the valve assembly includes a transmitter module as the electric circuit mounted on the support plate that is part of or attached to the base of the inner valve.

The valve assembly according to the present invention that includes an energy source and a transmitter module can be used together with a receiver module, and a main module to form a system for monitoring the conditions inside an inflatable member such as a vehicle tire. The transmitter module is typically an electric circuit for transmitting data via radio waves. The transmitter module can also include sensors such as pressure and temperature sensors. The transmitter module is located inside the inflatable member and obtains data on conditions therein via the sensors. The data is then transmitted to a receiver module. The receiver module is a radio frequency receiving and data processing unit that receives and processes data received from the transmitter module. The resulting data is sent to a main module connected to the receiving module. The main module is a unit that receives and processes data from the receiver module. The resulting information is displayed for review by the user such as the driver of a vehicle.

VALVE ASSEMBLY

Figure 2:
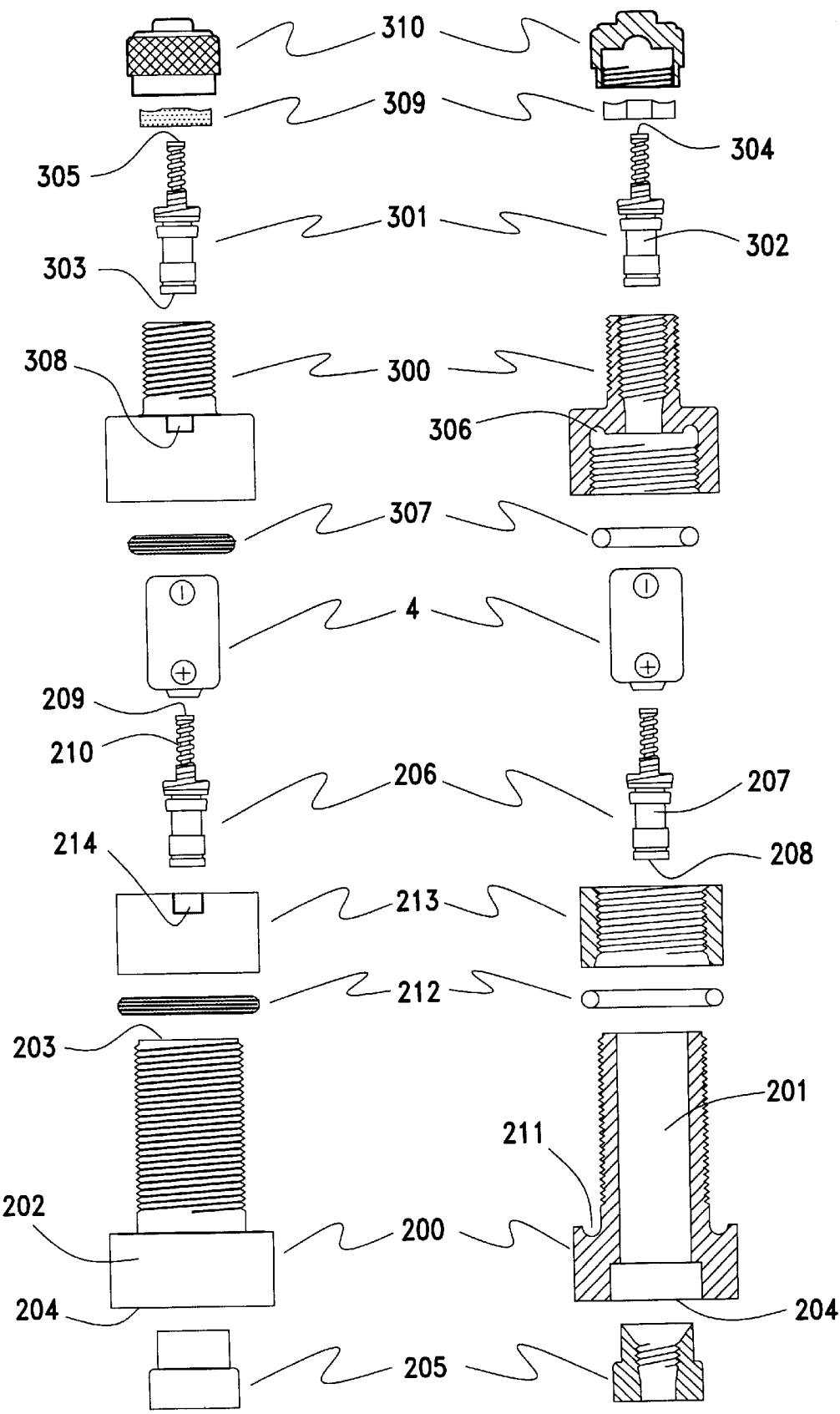
FIG. 2 is an exploded view of the valve assembly shown in FIG. 1.

As shown in FIGS. 1 and 2, valve assembly 1 includes a main body member 200 that can be a tubular body having an outer end 203 and base end 204. Passageway 201 is the bore of main body member 200 and permits fluid flow such as air flow through main body member 200. Inner valve 206 and outer valve 301 are at opposite ends of passageway 201. Energy source 4 is shown as a cylindrical battery in passageway 201 between the inner valve 206 and the outer valve 301.

As shown in FIGS. 1 and 2, the base 202 of main body member 200 can have a larger diameter than the rest of main body member 200. The base 202 is positioned inside inflatable member 100 that can be a vehicle tire. Base 202 cooperates with a nut 213 to secure the valve assembly 1 to the inflatable member 100. A groove 211 containing an annular ring 212 prevents fluid leaks between the top edge of the base 202 and the inflatable member 100. The nut 213 contains tool indents 214 adapted to hold corresponding parts of a T-wrench 60 shown in FIGS. 8 and 9 that can be used to remove the nut 213 from the main body member 200.

Insulating member 205 can be a tubular body and is positioned inside the passageway 201 at the base 202 of the main body member 200. The insulating member 205 is made from electrically non-conductive material so that it insulates the main body member 200 from electrical contact with the inner valve 206.

Inner valve 206 as shown in FIGS. 1 and 2 can be a known plunger-type valve that controls fluid flow such as air at the base end 204 of the main body member 200. The inner valve 206 is secured inside the bore of the insulating member 205. The inner valve 206 includes an inner valve cylinder 207, an inner plunger head 208, and an inner plunger shaft 209. Inner valve cylinder 207 is secured in the bore of the insulating member 205 and contains the inner plunger shaft 209. The inner plunger shaft 209 can be in contact with the positive terminal of the energy source 4. The other end of the inner plunger shaft 209 is connected to the inner plunger head 208 that is outside the inner valve cylinder. A spring 210 is wrapped around the section of the inner plunger shaft 209 that extends outside of the inner valve cylinder 207 and is in contact with the energy source. The normal action of the spring 210, absent any external force, moves the inner plunger shaft 209 so that the inner plunger head 208 seals the inner valve cylinder 207 thus preventing flow of fluid out of the tire. In the embodiment shown in FIG. 1, the energy source 4 in the valve assembly 1 exerts force on the inner valve plunger shaft 209 so that the inner plunger head 208 does not seal the inner valve cylinder 207. In this way, the inner valve 206 is at least partially open as shown in FIG. 1.

Outer body member 300 can be a tubular body and is connected to the outer end 203 of the main body member 200. Outer valve 301 as shown in FIGS. 1 and 2 can also be a known plunger-type valve that controls fluid flow at the outer end 203 of the main body member 200. The outer valve 301 is secured inside the bore of the outer body member 300. The outer valve 301 can be identical to the inner valve 206. The outer valve 301 includes an outer valve cylinder 302, an outer plunger head 303, and an outer plunger shaft 304. Outer valve cylinder 302 is secured in the bore of the outer body member 300 and contains the outer plunger shaft 304. The outer plunger shaft 304 is connected to the outer plunger head 303 that is outside the outer valve cylinder. The outer plunger head 303 is in contact with the negative terminal of the energy source 4. A spring 305 is wrapped around the section of the outer plunger shaft 304 that extends outside of the outer valve cylinder 302. The normal action of the spring 305 moves the outer plunger shaft 304 so that the outer plunger head 303 seals the outer valve cylinder 302 thus preventing flow of fluid in or out of the passageway of the main body member 200.

Figure 8:
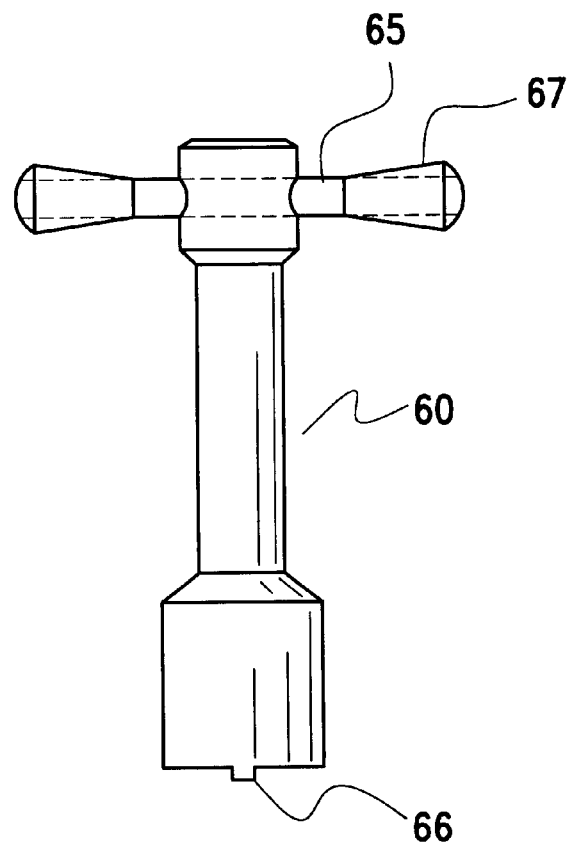
FIG. 8 is an elevational view of a T-wrench for use with the valve assembly of FIG. 1.
Figure 9:
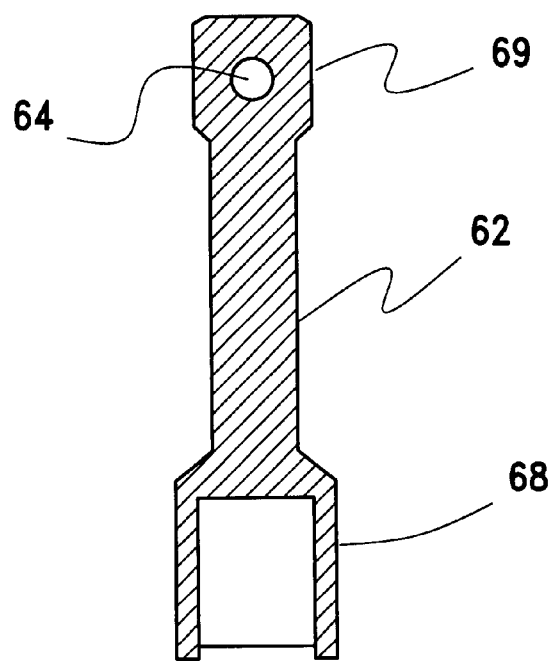
FIG. 9 is a cross-section of the elongated member of the T-wrench shown in FIG. 8.

As shown in FIGS. 1 and 2, the outer body member 300 has tool indents 308 adapted to hold corresponding parts of a tool 60 shown in FIGS. 8 and 9 that is used to conveniently remove the outer body member 300 from the main body member 200. There is also a groove 306 inside the outer body member 300 that contains an annular ring 307 to prevent fluid leaks around the top edge of the main body member 200. A valve cap 310 and washer 309 for the outer end of the outer body member 300 are also shown in FIG. 2.

Figure 3:
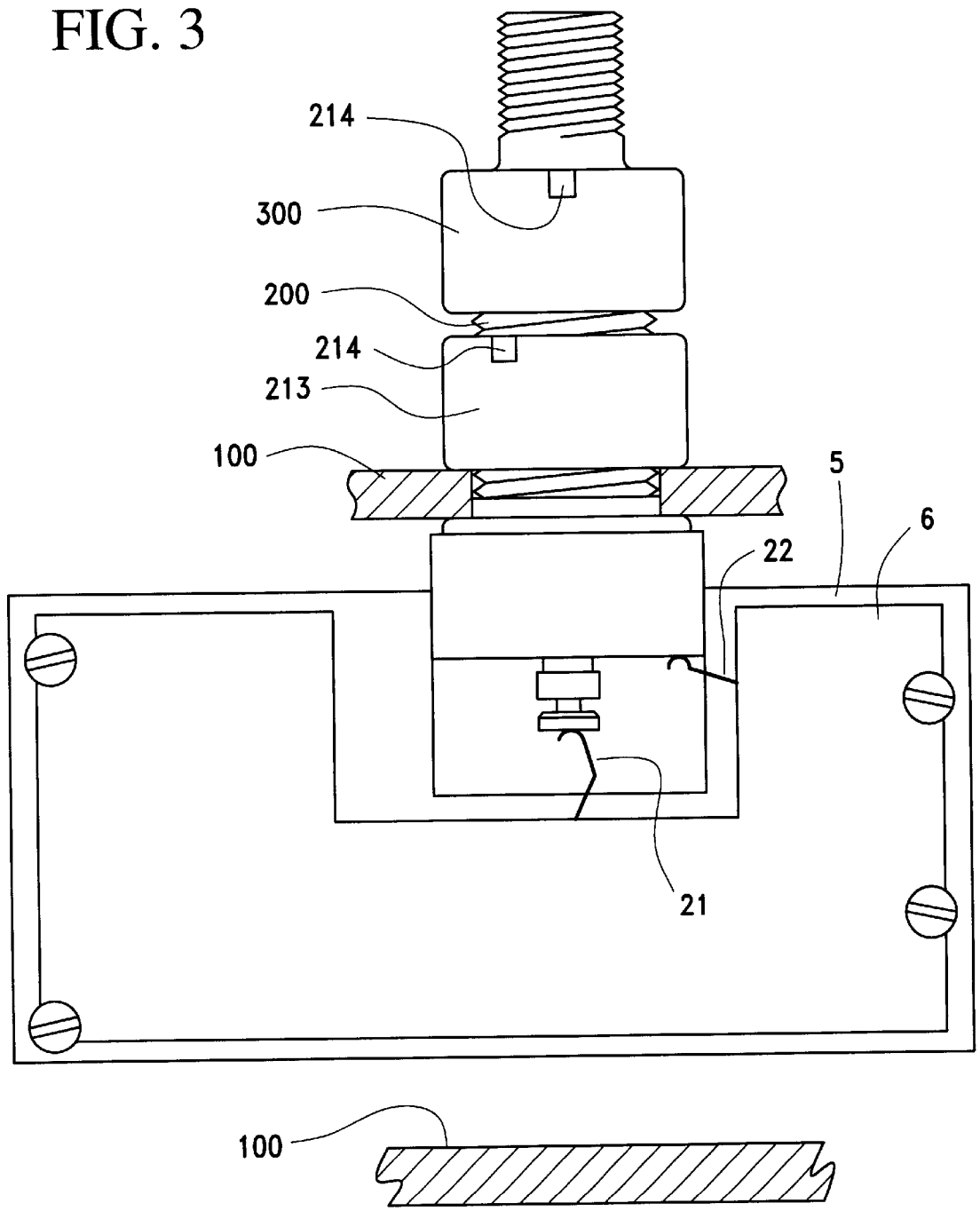
FIG. 3 is an elevation view of the valve assembly of FIG. 1 on a fluid-containing member such as a vehicle tire.

In the embodiment shown in FIGS. 1, 2, and 3, the inner valve 206, the outer valve 301, the main body member 200, and the outer body member 300 are all made from electrically conductive material. During normal operation of the valve assembly 1 as shown in FIG. 1, the inner valve 206 is in contact with the positive terminal of the energy source 4. The inner plunger head 208 is also connected to an electrically conductive member 21 such as a flexible metal band or metal spring. The outer valve 301 is in contact with the negative terminal of the energy source 4. The electrical energy from the energy source 4 goes through the outer valve 301, the outer body member 300, and the main body member 200. The base 202 is connected to a second electrically conductive member 22 that can also be a flexible metal band or metal spring. An electric circuit is formed by the connection of the electrically conductive members 21 and 22. As show in FIG. 1, the insulating member 205 prevents direct electrical contact between the inner valve 206 and the main body member 200.

In another embodiment of the invention, the support plate 5 can be made from an electrically conductive material and form part of the electrical circuit through direct contact with base 202 of the main body member 200.

When additional fluid such as air is added to the tire using conventional air pumps, the outer plunger shaft 304 is moved toward the inside passageway 201 and in turn moves the outer plunger head 303 and the energy source 4 toward the base 202 of the main body member 200. Movement of the energy source 4 also moves the inner plunger shaft 209 and inner plunger head 208 so that the inner valve 206 is opened even further than it was without the external force of the air pump. The air is thus able to freely flow into the outer valve 301, through passageway 201, around energy source 4, and through inner valve 206 and into the inflatable member 100.

An important advantage of the valve assembly 1 according to the present invention is the convenient manner in which the energy source 4 can be removed and replaced without deflating or otherwise disturbing the inflatable member itself. In the case of a tire, there is no need to dismount the tire from the vehicle or deflate the tire to replace the energy source 4.

The energy source 4 can be accessed by first removing the outer body member 300 containing the outer valve 301 from the main body member 200. When the energy source 4 is removed, it no longer exerts any force on the inner plunger shaft 209. The normal action of the spring 210 moves the inner plunger shaft 209 toward the outer end 203 of the main body. The inner plunger head 208 thus forms a seal with the edge of the inner valve cylinder 207. Thus, even though the outer valve has been removed to access the energy source, the inner valve 206 prevents fluid from flowing out of the inflatable member.

The replacement energy source is then inserted into the passageway 201 and the outer body member 300 is re-connected to the outer end of the main body member 200. The valve assembly 1 shown in FIG. 1 returns to its normal operating condition in which the outer valve 301 is closed and the energy source 4 cooperates with the inner valve 206 to keep the inner valve at least partially open.

The removal of the outer body member 300 or the nut 213 can be conveniently accomplished by using the T-wrench 60 shown in FIGS. 8 and 9. As shown in FIGS. 8 and 9, T-wrench 60 includes elongated member 62 having an enlarged upper section 69 and an enlarged lower section 68. Section 69 includes passageway 64 for receiving cylindrical member 65. Section 68 includes a plurality of protrusions 66. T-wrench 60 can include cover members 67 which are adapted for placement onto the end portions of cylindrical member 65. During use of the T-wrench, protrusions 66 engage tool indents 308 located on the outer body member 300 and tool indents 214 located on the nut 213. The cylindrical member 65 can be magnetized to facilitate removal of the energy source 4 from the valve assembly 1.

The energy source 4 that is typically used in the valve assembly 1 of the present invention can be a series of batteries that provide enough current to operate the components of the electrical circuit formed by the battery and the valve assembly 1. The total diameter of the energy source 4 is typically at least about 0.3 mm smaller than the diameter of passageway 201 to permit adequate fluid flow around energy source 4. The two-part design of the valve assembly 1 permits convenient adjustment of the length of the passageway containing the battery. From a practical viewpoint, the passageway can be lengthened up to 25 mm if desired. The passageway 201 can also be enlarged up to 8.7 mm in diameter if desired. It is particularly advantageous that adjustments can be made without changing the overall dimensions of the valve assembly which comply with the ISO standards for dimensions of valves for car tires.

A possible energy source can be a series or sequence of three commercially available batteries wherein each battery is 1.4 volt, 230 mA/hour with a diameter of 7.8 mm and 5.4 mm high. The battery sequence typically has a covering material over all of the batteries. A three battery sequence, including the covering material, typically has an outer diameter of 7.8 mm and a height of 16.2 mm. Such a three battery sequence has a potential difference of 4.2 V and an electric charge of 230 mA/hour. If the valve assembly 1 is used in a system for monitoring the condition of vehicle tires and the vehicle is used about 4 hours a day, such a sequence of batteries can last up to 2 years. Another possible series or sequence of batteries is a series or sequence of four commercially available batteries wherein each battery is 1.4 volt, 130 mA/hour with a diameter of 7.9 mm and 3.6 mm high. Such a four battery sequence has a potential difference of 5.6 V and an electric charge of 130 mA/hour.

It is advantageous to make the shape of the battery such that the end inserted into the valve assembly 1 has a different shape relative to the other end of the battery in order to ensure that the correct end of the battery is inserted into the valve assembly 1. In FIG. 1, the energy source 4 has a tapered end 24 and the upper section 23 of the insulating member 205 is shaped to fit the tapered end 24. The tapered end 24 of the energy source makes contact with the inner valve 206 only by fitting into the upper section 23. The opposite end of the energy source is not tapered. Therefore, if the untapered end were inserted into passageway 201, the energy source would not fit into the upper section 23 of the insulating member 205 and would not make contact with the inner valve 206. The user is quickly alerted to the incorrect orientation of the energy source and would make the appropriate correction.

VALVE ASSEMBLY INCLUDING THE TRANSMITTER MODULE

The valve assembly 1 according to the present invention and the energy source 4 can be used to provide electrical energy to an electrical device, circuit, or chip connected to the electrically conductive members 21 and 22 as illustrated in FIGS. 1 and 3. As shown in the embodiment of the valve assembly 1 in FIG. 1, the outer valve 301, outer body member 300, the inner valve 206, and main body member 200 cooperate with energy source 4 to form an electrical circuit. Suitable electrical devices, circuits, or chips can be selected from those that are commercially available such as those described in the National Semiconductor Handbook and other handbooks that are known in the electronics field. The electrical device, circuit, or chip can be mounted on a support plate 5 that can be part of or attached to base 202 of the main body member 200.

In a particularly preferred embodiment, a transmitter module 6 is connected to the electrically conductive members 21 and 22 so that it is part of the electrical circuit formed by the valve assembly 1 and energy source 4. The transmitter module 6 can be mounted on support plate 5 that can be a part of or attached to base 202 of main body member 200 as shown in FIGS. 1 and 3. When the valve assembly 1 is attached to an inflatable member 100 such as a tire, the base 202 and the transmitter module 6 are inside the inflatable member 100. In the embodiment shown in FIG. 1 and 3, the support plate 5 is also inside inflatable member 100. During normal operation of tire, while the vehicle is in motion, the base 202, support plate 5 and transmission module 6 are subject to strong centrifugal forces. Therefore, it is important that the main member 200 and base 202 are securely fastened to the wheel section of the tire. Likewise, it is important that support plate 5 is actually a part of the main body member 200 or is securely attached to the base 202 of the main body member 200 to prevent separation of the support plate 5. The support plate 5 can be welded onto the base 202 as a secure means of attachment.

Figure 4:
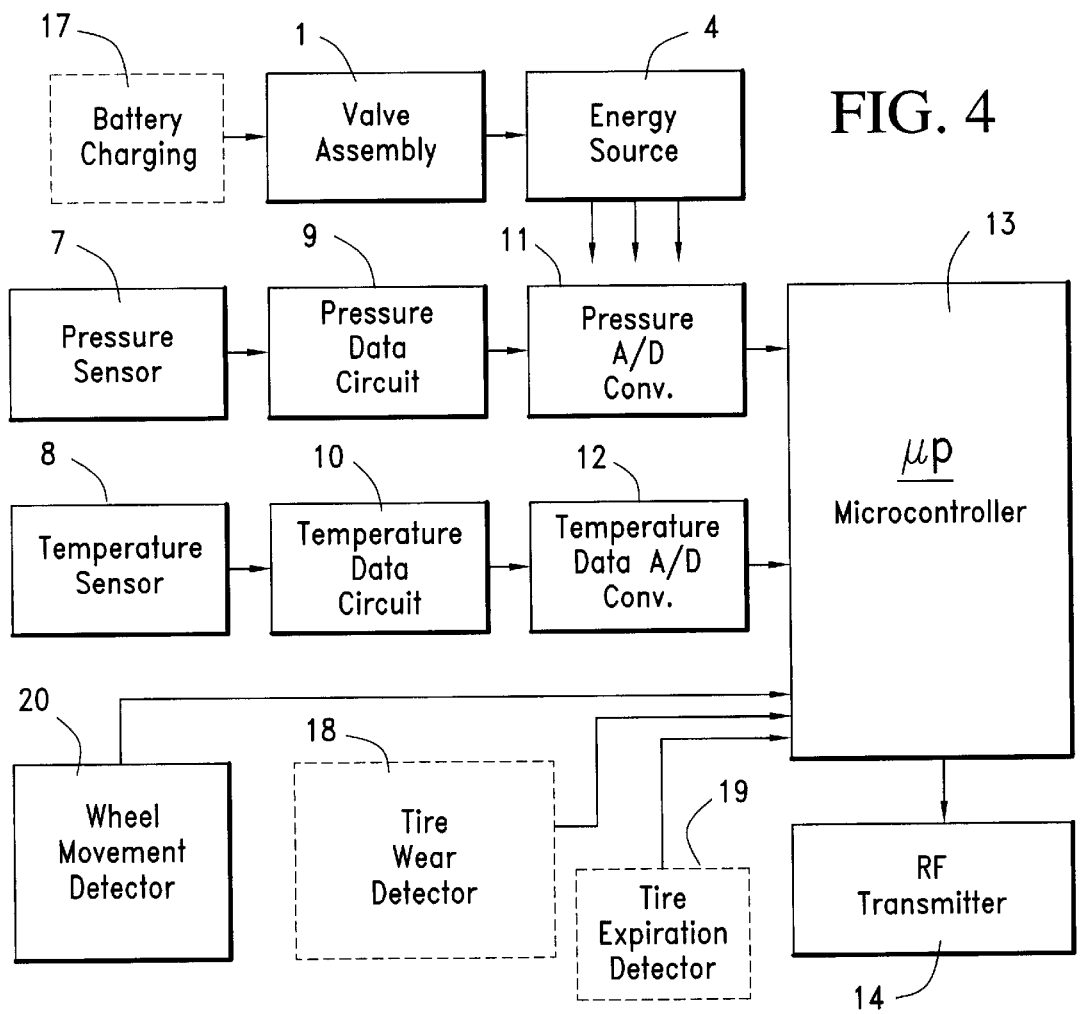
FIG. 4 is a block diagram of a transmitter module.

A block diagram of the transmitter module 6 is shown in FIG. 4. The transmitter module is an electrical circuit that includes a pressure sensor 7 and a temperature sensor 8, a microcontroller 13, and a radio frequency transmitter 14 that receive electrical energy from energy source 4. The pressure sensor 7 is typically an electrical device that measures the fluid pressure in an inflatable member such as a tire. Such devices are know in the art, for example, U.S. Pat. No. 4,804,808, U.S. Pat. No. 4,823,107, U.S. Pat. No. 4,893,110, U.S. Pat. No. 5,071,259, U.S. Pat. No. 5,140,851, U.S. Pat. No. 5,193,387, U.S. Pat. No. 5,297,424, U.S. Pat. No. 5,573,610, U.S. Pat. No. 5,656,993, GB 2171548, DE 2656235, DE 19522486, and FR 2225300, all herein incorporated by reference. The temperature sensor 8 is typically an electrical device that measures the temperature inside the inflatable member such as a tire. Such devices are also known in the art, for example, U.S. Pat. No. 4,823,107, U.S. Pat. No. 4893110, U.S. Pat. No. 5,071,259, U.S. Pat. No. 5,140,851, U.S. Pat. No. 5,193,387, U.S. Pat. No. 5,297,424, U.S. Pat. No. 5,573,610, and U.S. Pat. No. 5,656,993 all herein incorporated by reference. The radio frequency transmitter 14 is also known in the art, for example, a radio frequency transmitter such as those disclosed in U.S. Pat. No. 3533063 and U.S. Pat. No. 4,737,760. Such transmitters are described in the above mentioned National Semiconductor Handbook.

Microcontroller 13 controls the energy consumption and signal transmission of the transmitter module 6. Microcontrollers suitable for use in the transmitter module 6 are known in the art and are commercially available.

The block diagram in FIG. 4 shows a transmitter module 6 that is particularly suitable for use in a valve assembly that contains a battery as the energy source and is used in a vehicle tire. The transmitter module 6 can be used to monitor the pressure and temperature conditions inside the vehicle tire. Such a transmitter module 6 can include additional electrical devices or circuits that are known in the electronics field such as a pressure data conditioner circuit 9, a temperature data conditioner circuit 10, a pressure data analog/digital converter 11, and a temperature data analog/digital converter 12. The transmitter module 6 can also include other known devices such as battery charging device 17, a tire wear detector 18, a tire expiration detector 19, and a wheel movement detector 20.

The pressure sensor 7 and the temperature sensor 8 measure the pressure and temperature conditions inside the tire. The pressure data is communicated from the sensor 7 to the pressure data conditioner circuit 9 where the data is conditioned and then communicated to the pressure data analog/digital converter 11 to convert the analog pressure data to digital form. Likewise, the temperature data is communicated from the sensor 8 to the temperature data conditioner circuit 10 where the data is conditioned and then communicated to the temperature data analog/digital converter 12 to convert the analog temperature data to digital form. The analog/digital converters 11 and 12 send the digital pressure and temperature data to the microcontroller 13.

The microcontroller 13 adds an identification code for each tire on the vehicle to the pressure/temperature data received from that particular tire. The identification code associates the pressure/temperature data with a particular tire and avoids interference from signals transmitted by similar transmitter modules on other vehicles. The microcontroller 13 can be programmed to operate in a manner that minimizes energy consumption to increase the useful life of the battery. In one embodiment, the microcontroller 13 is programmed to go into low energy consumption mode when a pre-programmed period of time has passed since the last receipt of data transmission. In a particularly preferred embodiment for reduction of energy consumption, the transmitter module 6 includes a wheel movement detector 20 that is capable of distinguishing between a stationary and moving vehicle. Such detectors are known in the art, for example, WO 96/06747 herein incorporated by reference. A suitable wheel movement detector 20 can be either a system that includes a mercury bulb or a system that includes a double sheetlet of metal. The wheel movement detector 20 transmits signals to the microcontroller 13 that indicate whether the vehicle is stationary or moving. The microcontroller 13 is programmed to go into low energy consumption mode if the vehicle is stopped for a pre-programmed period of time. When the wheel movement detector 20 detects that the vehicle is in motion, it sends a signal to microcontroller 13 so that microcontroller 13 can go into the normal energy consumption mode for normal operation.

Figure 7:
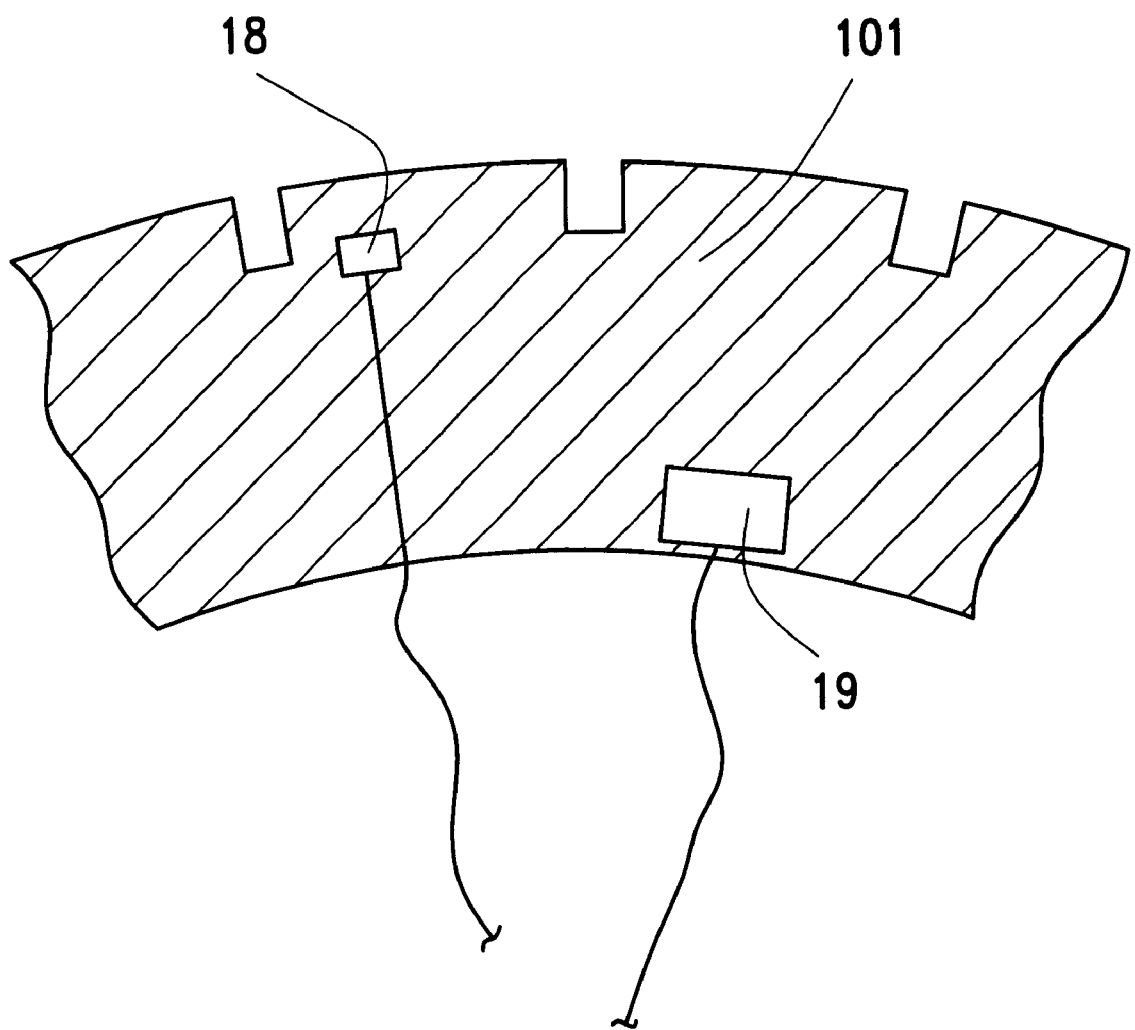
FIG. 7 is a transversal cross-section of the rubber section of a vehicle tire with a device to detect the wear of the tread of the tire and a device to signal the expiration date of the tire.

The tire wear detector 18 is typically placed in the rubber section 101 of a vehicle tire as shown in FIG. 7. Tire wear detectors are known in the art and typically are wire terminals that are located at a particular depth with respect to the outer surface of the tread of a new tire. When the tread has been worn to the particular depth of the wire terminal, a signal is sent to the microcontroller 13. The tire expiration detector 19 can also be inserted into the rubber section 101 of the tire as shown in FIG. 7. Tire expiration detectors are known in the art and typically include a clock that has its own battery. The tire expiration detector 19 can be programmed to send a signal to the microcontroller 13 at a set date that is considered the expiration date of the tire.

The battery charging device 17 can also be a part of the transmitter module 6 shown in FIG. 4. Such charging devices are known in the art. A suitable battery charging device 17 is a rotor that converts rotating motion into electrical energy. The electrical energy that is generated can be used to charge the battery that is used as the energy source 4 inside the valve assembly 1.

RECEIVER MODULE

The valve assembly according to the present invention can be advantageously used as part of the known systems for monitoring conditions such as pressure and temperature inside a vehicle tire. A particulary advantageous system includes the valve assembly 1 with transmitter module 6 and a receiver module that is capable of receiving and processing data transmitted by the transmitter module 6. Receivers suitable for use as receiver modules are known in the art, for example, U.S. Pat. No. 4,734,674, U.S. Pat. No. 5,573,610, European Patent Appl. 671 289, and WO 90/00119, all herein incorporated by reference.

Figure 5:
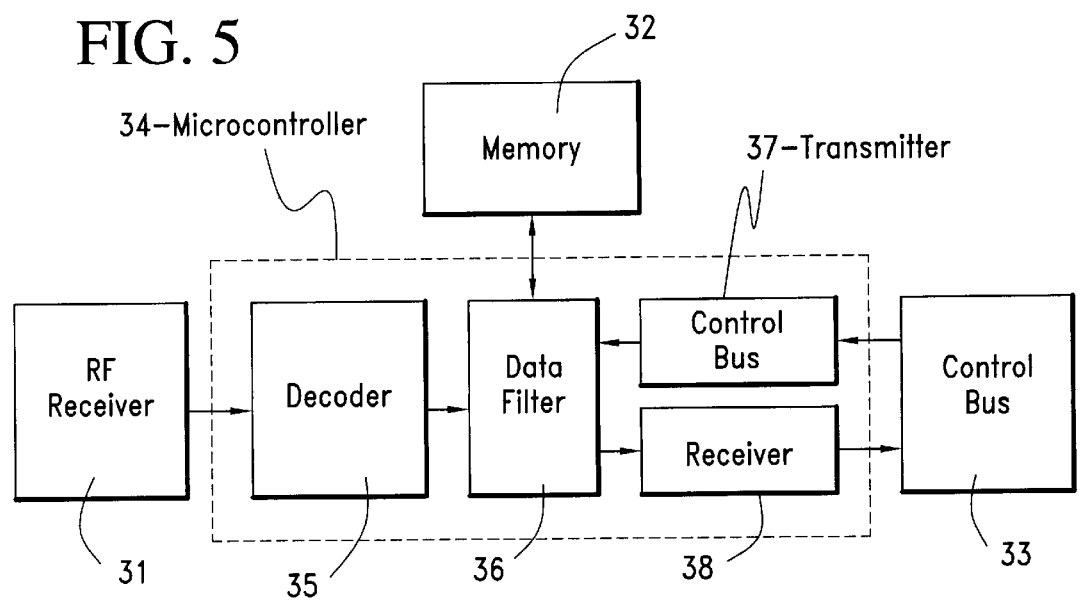
FIG. 5 is a block diagram of a receiver module.

FIG. 5 is a block diagram of a receiver module 30 that can be used with valve assembly 1 and transmitter module 6 in a system for monitoring conditions in a vehicle tire. The receiver module 30 includes a radio frequency receiver 31, a control bus 33, and a microcontroller 34. The radio frequency receiver 31 receives signals transmitted by a transmitter module such as the transmitter module 6 of FIG. 4. Commercially available receivers such as R.F. Solutions RX1-XXA are suitable for use in receiver module 30. The signals are transmitted to the microcontroller 34 for processing.

The microcontroller 34 is an integrated chip designed to control the receiver module. The microcontroller 34 performs the logical control of the receiver module 30. Known microcontrollers can be used in receiver module 30. The microcontroller 34 can also include a decoder 35, a code checking and data filter 36, a control bus transmitter 37, and a control bus receiver 38 whose functions can be performed by either a software algorithm programmed in the microcontroller 34 or by means of an electrical circuit. The functions are typically performed by known software algorithms. The decoder 35 decodes serial data that is received by the receiver module 30. The code checking and data filter 36 checks whether the codes in the signals match the stored identification codes of the tires in the system. The control bus transmitter 37 and control bus receiver 38 establish communication with the control bus 33. The control bus 33 is known and is typically a physical connection of wires or cable. A particularly useful control bus for cars is commercially available in Europe from BOSCH and is known as bus CAN (for Controller Area Network) and is comprised of two cables and a microcontroller.

The microcontroller 34 can also include an embedded memory unit 32 such as EEPROM memory that stores the identification code for each vehicle tire. Known memory units such as Microchip 12CE5XX can be used. The microcontroller 34 uses the stored identification code to associate data received by the receiver module 30 with a particular tire being monitored by the system. This ability to associate data with tires in the system avoids interference from signals transmitted by transmitter modules on other vehicles.

The total number of receiver modules 30 in the system depends upon specific factors such as the length of the vehicle, the transmitting distance of the transmitter module, and legal restrictions on radio wave transmission. The range of typical radio frequency transmitters suitable for the system described herein is about 15 m so a normal car can have only one receiver module. Typically, longer vehicles such as trucks with large trailers require more than one receiver module. However, the range of a transmitter can be increased by using a larger battery which is possible with the valve assembly according to the present invention. Therefore, it is possible to use only one receiver module on longer vehicles with appropriately sized batteries. Possible legal restrictions on radio transmissions in the future may mean that the range of the transmissions will be limited so that a receiver module is needed for each tire.

When more than one receiver module 30 is used, the receiver modules are connected with each other by control bus 33.

MAIN MODULE

Figure 6:
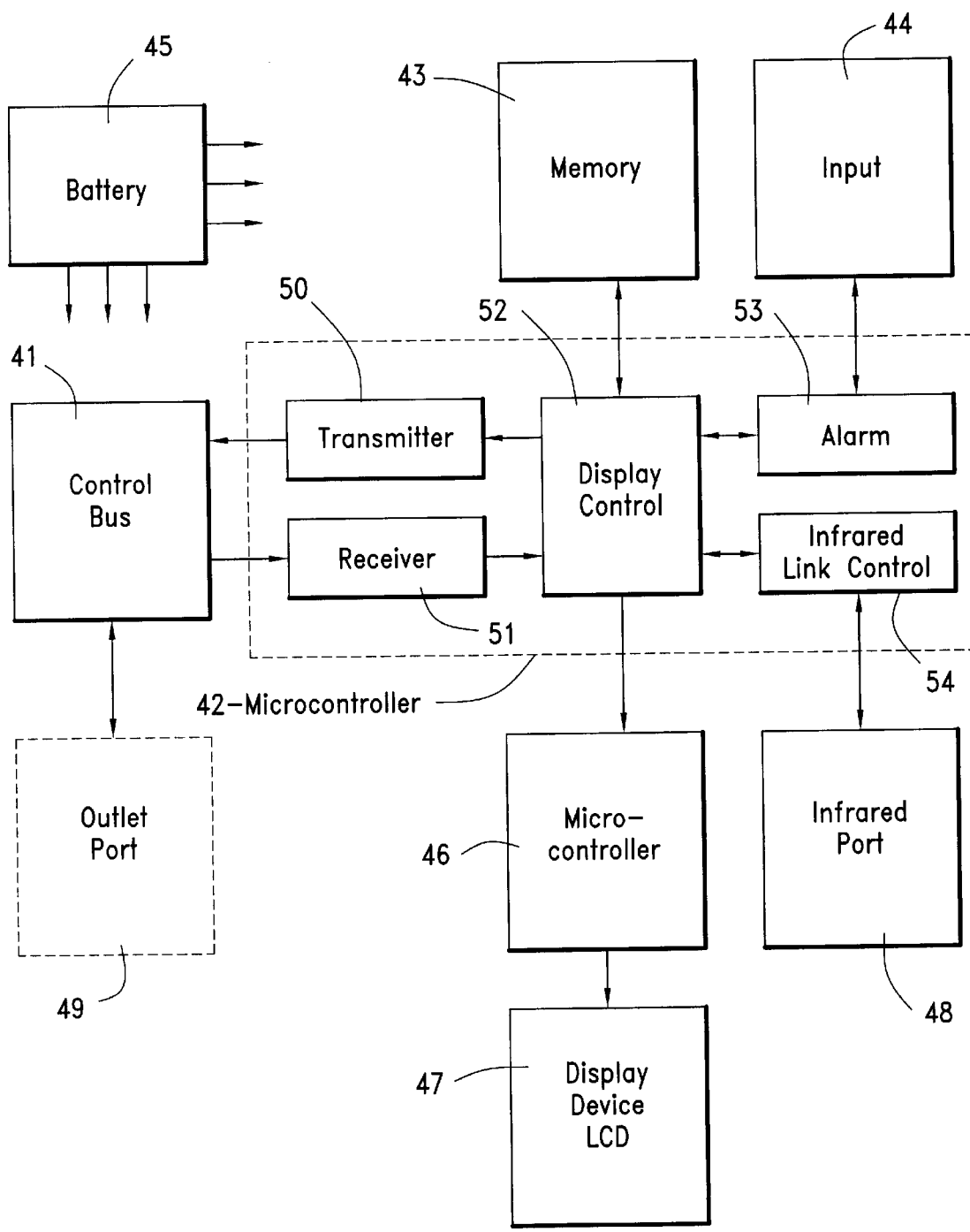
FIG. 6 is a block diagram of a main module.

FIG. 6 is a block diagram of a main module 40 that is connected to the receiver module 30 typically by means of a cable. Main module 40 receives and processes data from the receiver module 30 and displays the resulting information to the driver of the vehicle. Main module 40 also sets the communication protocol for all of the receiving modules 30 in the system. The main module 40 receives electrical energy for its operation from an energy source 45 such as a battery.

The main module 40 includes a microcontroller 42, control bus 41, display controller 46, and display device 47. The control bus 41 allows connection of the main module 40 to other devices such as a computer and also establishes communication with the receiver module 30. The bus CAN described previously can also be used as the control bus 41 on the main module 40. The main module 40 can be located inside the vehicle so that the driver can read the information on display device 47 such as an LCD display.

The microcontroller 42 is a commercially available integrated chip such as PIC 16C6X that performs logical control of the main module 40. The microcontroller 42 includes a control bus transmitter 50, a control bus receiver 51, and a data and display control 52 whose functions can be performed by a software algorithm programmed in the microcontroller 42 or by means of electrical circuits. The functions are typically performed by known software algorithms. The control bus transmitter 50 sends data to the control bus 41 and the control bus receiver 51 receives data from the control bus 41. The data and display control 52 generates a sequence of orders to display information in the display device 47.

An alarm control unit 53 is part of the microcontroller 42 that checks several parameters and generate an alarm signal under certain predetermined circumstances. The alarm control unit 53 can detect when received data is inside or outside predetermined limits and generates an alarm signal depending upon the result of the comparison of data received from the receiver unit with values that have been previously programmed into the main module. For example, the alarm control unit 53 can be programmed to detect when the battery power is low, when the pressure is outside certain limits, when the expiration date has passed or when the identification codes of the incoming data do not match the identification code of the tires of a particular system.

The main module 40 can also contain a memory unit 43 such as EEPROM memory that can store data received from the receiver module 30. The main module 40 can be programmed so that the data received during a particular period, for example, the last three hours of vehicle operation, are stored in the memory unit 43. The data can be retrieved later to determine tire conditions during that period. This could useful after an accident to determine tire conditions prior to and during the accident.

An input device 44 such as a keyboard or buttons can be included in the main module 40 to input values such as the ranges of acceptable pressure values for comparison with incoming pressure data. An outlet port 49 for connection to a computer can also be included in main module 40. An infrared port 48 can also be included that cooperates with the infrared link control 54 in the microcontroller 42 for communication with other devices that have infrared port communication capability.

The valve assembly of the present invention can also be used in known systems that monitor various conditions such as temperature and pressure inside inflatable members such as vehicle tires. Such systems are disclosed in U.S. Pat. No. 5,285,189, U.S. Pat. No. 5,483,827 (WO 95/22467), U.S. Pat. No. 5,540,092, U.S. Pat. No. 5,656,993, WO 94/06640, and WO 96/06747, all herein incorporated by reference. The energy source in the valve assembly can be used to provide electrical energy to such known systems and can be conveniently replaced when necessary.

What is claimed is:

1. A valve assembly for control of fluid flow in or out of fluid-containing member comprising,
    main body member 200 having a passageway 201 extending therethrough,
    outer body member 300 having a passageway extending therethrough and which is connected to a first section of main body member 200,
    insulating member 205 having a passageway extending therethrough and which is connected to a second section of main body member 200,
    said passageways of main body member 200, outer body member 300 and insulating member 205 cooperating to define a continuous passageway for fluid flow,
    an inner valve 206 engaging said insulating member 205 so as to control the flow of fluid into or out of said continuous passageway, and
    an outer valve 301 engaging said outer body member 300 so as to control the flow of fluid into or out of said continuous passageway.

2. The valve assembly according to claim 1 that further comprises an electrical energy source 4 located within said continuous passageway and operatively connected to said inner valve 206 and said outer valve 301, wherein the outer valve 301, outer body member 300, the inner valve 206, and main body member 200 cooperate with energy source 4 to form an electrical circuit.

3. The valve assembly according to claim 2 further comprising a pressure sensor or a temperature sensor, a microcontroller, and a radio frequency transmitter that receive electrical energy from said energy source.

4. The valve assembly according to claim 2 wherein the fluid-containing member is a vehicle tire and the energy source is a battery.

5. The valve assembly according to claim 4 wherein the electrical circuit further comprises at least one of a battery charging device, a tire wear detector, a tire expiration detector, and a wheel movement detector.

6. The valve assembly according to claim 2 further comprising a support plate 5 attached to the main body member 200.

7. The valve assembly according to claim 6 further comprising a pressure sensor or a temperature sensor, a microcontroller, and a radio frequency transmitter that are attached to support plate 5 and receive electrical energy from said energy source.

8. A system for monitoring conditions inside fluid-containing member comprising a valve assembly 1 operatively connected to
    a transmitter module 6 located inside the fluid-containing member for transmitting signals and
    a receiver module 30 for receiving transmission of said signals from said transmitter module 6 wherein said valve assembly 1 comprises,
    main body member 200 having a passageway 201 extending therethrough,
    outer body member 300 having a passageway extending therethrough and which is connected to a first section of main body member 200, insulating member 205 having a passageway extending therethrough and which is releasably connected to a second section of main body member 200, said passageways of main body member 200, outer body member 300 and insulating member 205 cooperating to define a continuous passageway for fluid flow, an inner valve 206 engaging said insulating member 205 so as to control the flow of fluid into or out of said continuous passageway, an outer valve 301 engaging said outer body member 300 so as to control the flow of fluid into or out of said continuous passageway, and an electrical energy source 4 located in said continuous passageway and operatively connected to said inner valve 206 and said outer valve 301, wherein the outer valve mechanism 301, outer body member 300, the inner valve 206, main body member 200, and energy source 4 cooperate to provide electrical energy to transmitter module 6.

9. The system according to claim 8 wherein said transmitter module comprises a microcontroller, a radio frequency transmitter, and any of a pressure sensor or temperature sensor.

10. The system according to claim 8 wherein said fluid-containing member is a tire and said energy source is a battery.

11. The system according to claim 10 wherein said transmitter module further comprises any of a battery charging device, a tire wear detector, a tire expiration detector, and a wheel movement detector.

12. The system according to claim 8 wherein the signals transmitted by the transmitter module are radio waves.

13. The system according to claim 8 wherein said receiver module comprises a radio frequency receiver, a control bus, and a microcontroller.

14. The system according to claim 13 wherein said fluid-containing member is a vehicle tire and said receiver module further comprises a memory unit that stores the identification code for the vehicle tire.

15. The system according to claim 8 that further comprises a main module for receiving data communications from the receiver module and for displaying information obtained from said data communications.

16. The system according to claim 15 wherein said main module comprises a microcontroller, control bus, and display device.

17. The system according to claim 16 wherein said main module further comprises a memory unit for storing data communications received from the receiver module.

18. The system according to claim 16 wherein said main module further comprises an alarm unit that generates an alarm signal depending upon the result of the comparison of data received from the receiver unit with values that have been previously programmed into the main module.

19. The system according to claim 16 wherein the main module further comprises an input device and an outlet port.

* * * * *